US012685295B2

(12) United States Patent
Rothschild et al.

(10) Patent No.: US 12,685,295 B2
(45) Date of Patent: Jul. 21, 2026

(54) PET HARNESS

(71) Applicants: Margaret P. Rothschild, Los Angeles, CA (US); Robert L. Basom, Gretna, LA (US)

(72) Inventors: Margaret P. Rothschild, Los Angeles, CA (US); Robert L. Basom, Gretna, LA (US)

( * ) Notice: Subject to any disclaimer, the term of this patent is extended or adjusted under 35 U.S.C. 154(b) by 0 days.

(21) Appl. No.: 18/648,277

(22) Filed: Apr. 26, 2024

(65) Prior Publication Data

US 2025/0331501 A1      Oct. 30, 2025

(51) Int. Cl.
*A01K 27/00*      (2006.01)
*A01K 13/00*      (2006.01)

(52) U.S. Cl.
CPC .......... *A01K 27/002* (2013.01); *A01K 13/006* (2013.01)

(58) Field of Classification Search
CPC ............................ A01K 13/006; A01K 27/002
See application file for complete search history.

(56) References Cited

U.S. PATENT DOCUMENTS

| | | | | |
|---|---|---|---|---|
| 5,970,921 A | * | 10/1999 | Fulton .................. | A01K 27/006 119/858 |
| 7,052,345 B1 | * | 5/2006 | Rowan .................. | B63C 9/1255 441/80 |
| 7,841,344 B2 | * | 11/2010 | Schlosser ............. | A63B 29/021 441/106 |
| 8,726,421 B2 | * | 5/2014 | Alvarez ............. | A41D 13/0512 5/636 |
| 11,324,201 B1 | * | 5/2022 | Benishai .............. | A01K 27/002 |
| 2003/0150401 A1 | * | 8/2003 | Schmid ................ | A01K 13/006 119/815 |
| 2003/0220031 A1 | * | 11/2003 | McCormick ......... | A01K 27/002 441/88 |
| 2007/0181080 A1 | * | 8/2007 | Gibson ................ | A01K 27/001 119/815 |
| 2009/0107419 A1 | * | 4/2009 | Davis ................... | A01K 13/006 119/815 |
| 2010/0043725 A1 | * | 2/2010 | Hall ...................... | A01K 13/006 54/79.4 |
| 2013/0306001 A1 | * | 11/2013 | Bordeaux ............ | A01K 13/006 119/850 |
| 2017/0013804 A1 | * | 1/2017 | Fachner, Sr. ......... | A01K 27/001 |
| 2017/0099808 A1 | * | 4/2017 | Garfinkel ............. | A01K 13/006 |
| 2019/0099021 A1 | * | 4/2019 | Li ......................... | A47G 9/1081 |
| 2019/0104704 A1 | * | 4/2019 | Zablow ................ | A01K 27/001 |
| 2019/0297845 A1 | * | 10/2019 | Gilbert ................ | A01K 13/008 |
| 2020/0008399 A1 | * | 1/2020 | Bolton ................. | A01K 27/001 |
| 2020/0205379 A1 | * | 7/2020 | Leek .................... | A01K 13/006 |

(Continued)

FOREIGN PATENT DOCUMENTS

| | | | | | |
|---|---|---|---|---|---|
| DE | 202018001238 U1 | * | 6/2018 | .......... | A01K 27/001 |
| GB | 2350544 A | * | 12/2000 | .......... | A01K 13/006 |

(Continued)

*Primary Examiner* — Marisa V Conlon
*Assistant Examiner* — Hae Rie Jessica Byun
(74) *Attorney, Agent, or Firm* — Cynthia B. Rothschild

(57) ABSTRACT

This disclosure describes a pet harness with a permanently attached or detachable neck pillow configured to restrict movement of a pet's head following surgery. Numerous configurations are described and depicted in the drawings showing various ways in which the neck pillow can be incorporated into the pet harness.

16 Claims, 15 Drawing Sheets

(56)          References Cited

U.S. PATENT DOCUMENTS

| | | | | |
|---|---|---|---|---|
| 2020/0315762 A1* | 10/2020 | Correa | ..................... | A61D 9/00 |
| 2022/0015332 A1* | 1/2022 | Stewart | ................ | A01K 13/006 |
| 2022/0287814 A1* | 9/2022 | Sparks | ..................... | A61D 9/00 |
| 2022/0304788 A1* | 9/2022 | Miller | .................. | A01K 27/002 |
| 2023/0320316 A1* | 10/2023 | Cohn | ................... | A01K 1/0263 |
| | | | | 119/850 |
| 2024/0017803 A1* | 1/2024 | Sobjak | ................ | A01K 27/002 |

FOREIGN PATENT DOCUMENTS

| | | | | | |
|---|---|---|---|---|---|
| KR | 20200119578 A | * | 10/2020 | | |
| TW | M646286 U | * | 9/2023 | | |
| WO | WO-2020255175 A1 | * | 12/2020 | ........... | A01K 13/006 |

* cited by examiner

800

804

802

802

802

PET HARNESS

TECHNICAL FIELD

This disclosure relates to various harness configurations for a pet that are configured to position a neck pillow around the pet's neck to restrict movement of the pet's head following a surgical procedure.

BACKGROUND

When pet owners have surgery performed on their pets, those pets typically require a cone or other head restriction device to prevent the pet from pulling stitches and/or infecting a surgical incision site. Unfortunately, these devices are often cumbersome, uncomfortable, restrict the pet's ability to perform daily tasks and/or have limited utility outside the pet's recovery from surgery.

The subject matter claimed in the present disclosure is not limited to implementations that solve any disadvantages or that operate only in environments such as those described above. Rather, this background is only provided to illustrate one example technology area where some embodiments described in the present disclosure may be practiced.

SUMMARY

This paper describes various embodiments that relate to a pet harness that incorporates or allows for convenient attachment of a neck pillow.

A pet harness is described and includes a harness body, comprising: a neck portion defining an opening configured to accommodate passage of a head of a pet therethrough; a chest panel protruding from a first side of the neck portion and configured to extend between front legs of the pet; and a back panel protruding from a second side of the neck portion and configured to extend across a back of the pet. The pet harness also includes a neck pillow coupled to and extending around a periphery of the neck portion of the harness body and one or more straps extending from the harness body and configured to wrap around a torso of the pet to secure the harness body to the pet.

BRIEF DESCRIPTION OF THE DRAWINGS

Example embodiments will be described and explained with additional specificity and detail through the use of the accompanying drawings in which.

DETAILED DESCRIPTION

Pet harnesses are a widely used product that allow pet owners to walk and otherwise manage their pets. The described embodiments provides details on how the utility of a pet harness can be improved by incorporating or allowing attachment of a surgical neck pillow to the pet harness. The pet harness is configurable for use with at least dogs and cats and may also be used with other four-legged pets of similar size and dimensions.

Figure 1:
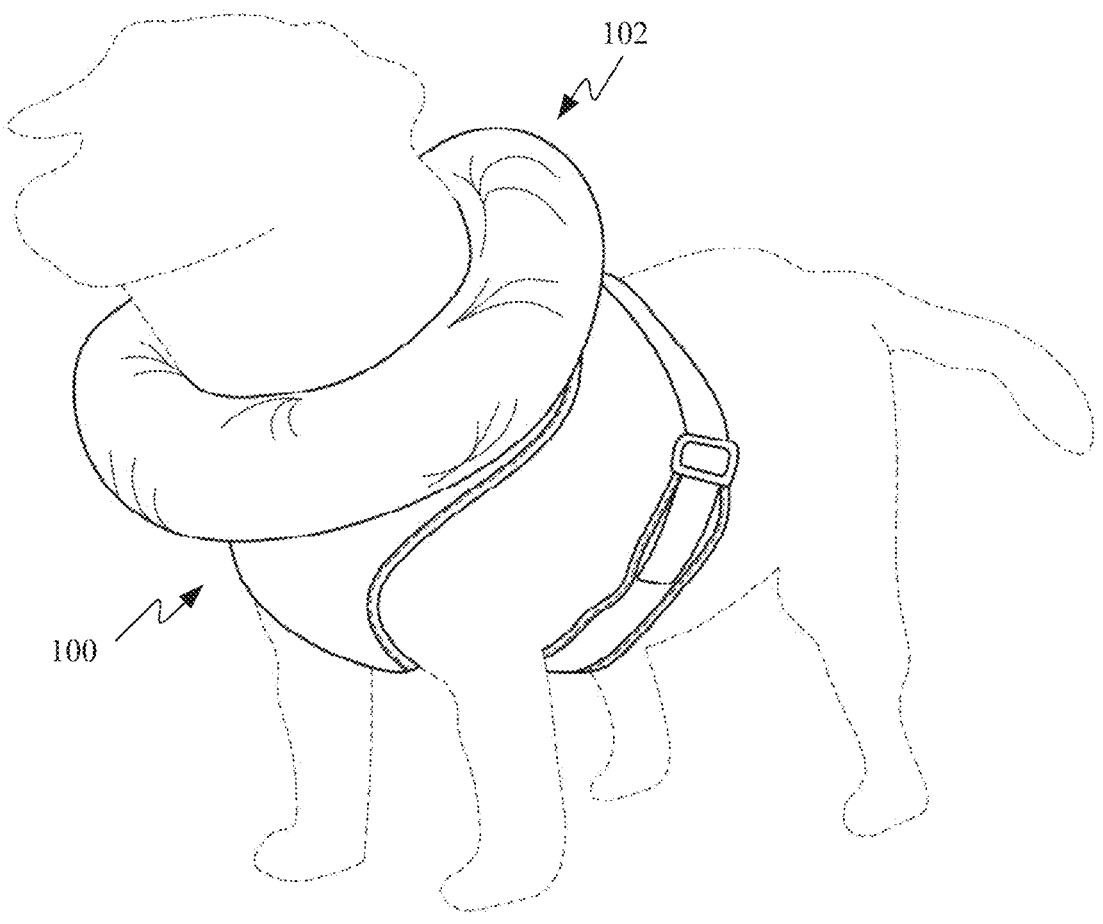
FIG. 1 shows an exemplary pet harness with a neck pillow arranged on an outline of a pet.

FIG. 1 shows a perspective view of an exemplary pet harness 100 having a neck pillow 102 and an outline of a pet demonstrating how the exemplary pet harness would be positioned on the pet for everyday use. The neck pillow is generally filled with different materials or inflated with air to provide a firm barrier that prevents the pet from chewing, licking or otherwise causing harm to themselves by aggravating a healing wound often associated with a recent spaying or neutering operation. Some materials that can be used to fill non-inflatable neck pillows include soft foam and beads.

Figure 2A:
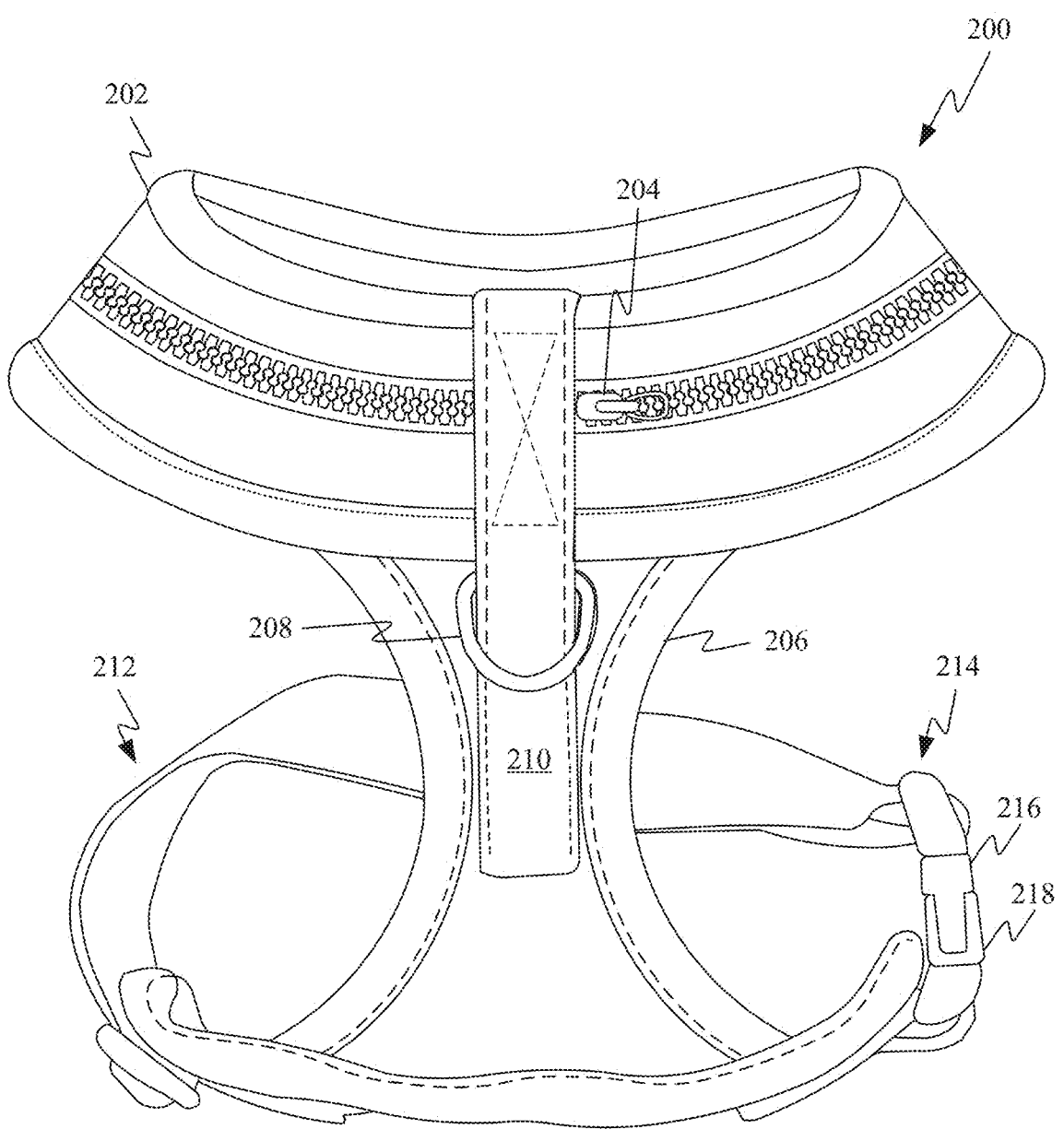
FIGS. 2A-2C show an exemplary harness having an inflatable neck pillow for restricting movement of a pet's head.

FIG. 2A shows a top down view of pet harness 200. Pet harness 200 includes a harness body that includes a neck portion 200 configured to wrap around a neck of a pet. In some embodiments, neck portion 200 can have clips that allow it to close around a neck of a pet and in other embodiments neck portion 200 defines a fixed-size opening sized to allow neck portion 202 to slide over the head of the pet before being positioned around the neck of the pet. Neck portion 202 is depicted including a zipper 204 that extends radially around neck portion 202 and allows access to a pouch region within neck portion 202. The pouch region is configured to store an inflatable neck pillow that can be deployed by unzipping the zipper, unfolding the neck pillow stored within the pouch region and inflating the neck pillow. This allows a pet owner to have easy access to the neck pillow in the event it is ever needed. Following use of the neck pillow the neck pillow can be folded back up and stowed back in the pouch region for later use. This can be particularly useful as a pet is recovering and only needs the neck pillow during unsupervised periods of time.

FIG. 2A also shows how the harness body includes a back panel 206 that extends off a first side of neck portion 202. Back panel 206 often includes a leash clip 208 allowing for the pet owner to attach a leash to back panel 206 of pet harness 200. Leash clip 208 is generally attached to neck portion 202 and back panel 206 by a leash clip attachment feature 210 that can take the form of a reinforced piece of fabric or leather. Leash clip attachment feature 210 extends across both neck portion 202 and back panel 206 to provide a robust way of keeping an enthusiastic pet from inadvertently breaking the leash clip off the harness.

FIG. 2A also shows a strap 212 attached to a distal end of back panel 206. In some embodiments, strap 212 can be referred to as a girth strap configured to wrap around the pet in a location behind the front legs of the pet. Strap 212 is shown including a strap buckle 214 for securing a distal end of strap 212 back to an opposing end of back panel 206. Strap buckle 214 can include a male element 216 and a female element 218 that engage to keep the distal end of strap 212 firmly attached to back panel 206. In some embodiments, strap 212 can instead attach to a chest panel of the harness body, which will be described in greater detail below. In some embodiments, a length of strap 212 can be adjusted to accommodate pets of different size and shape.

Figure 2B:
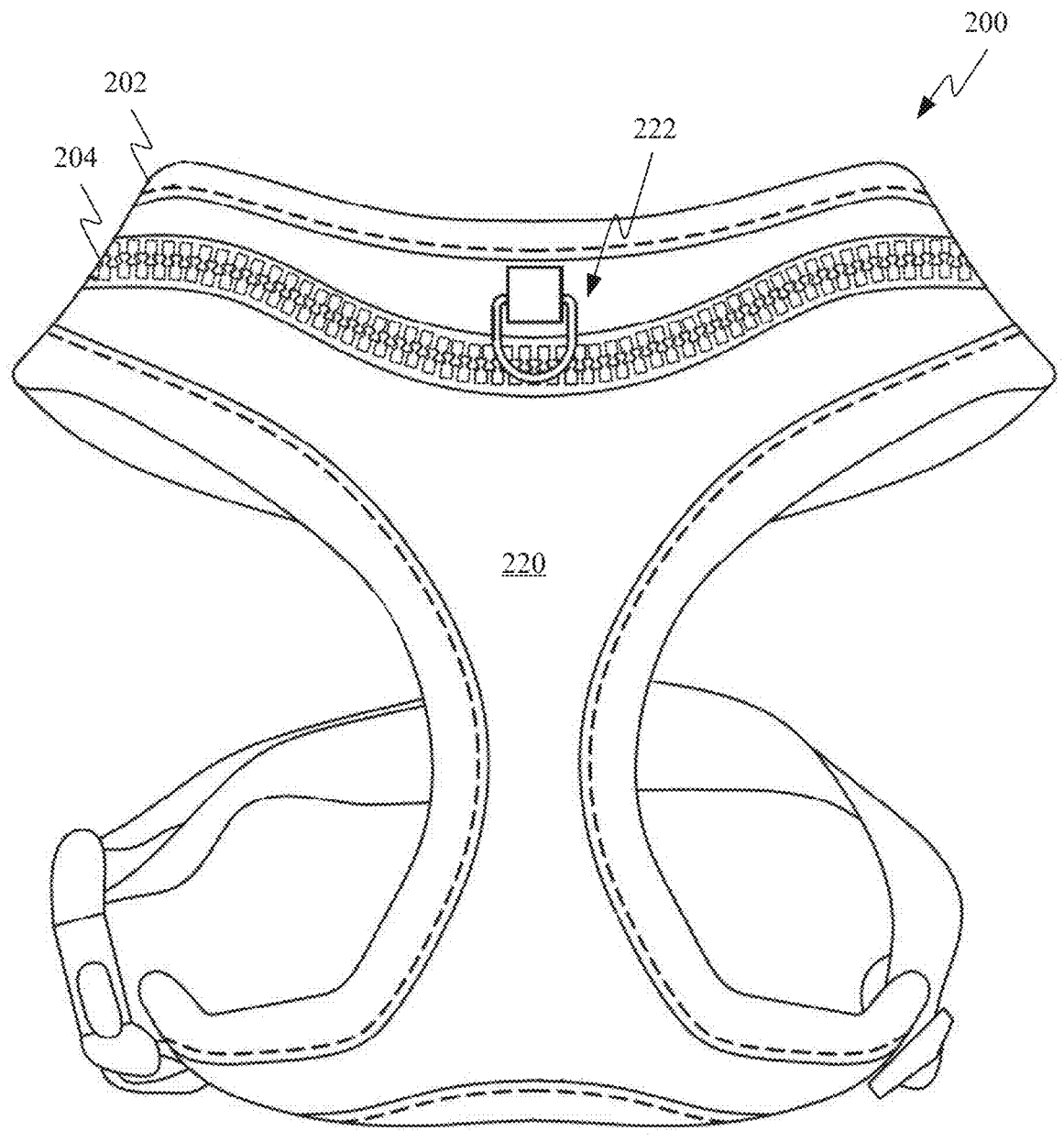

FIG. 2B shows a bottom view of pet harness 200. Zipper 204 is shown extending around the periphery of neck portion 202 and chest panel 220 is shown extending from an opposite side of neck portion 202 from the side that back panel 206 extends from. In some embodiments, chest panel 220 can also include a second leash clip 222 to allow a pet owner multiple options when attaching a leash to pet harness 200.

Figure 2C:
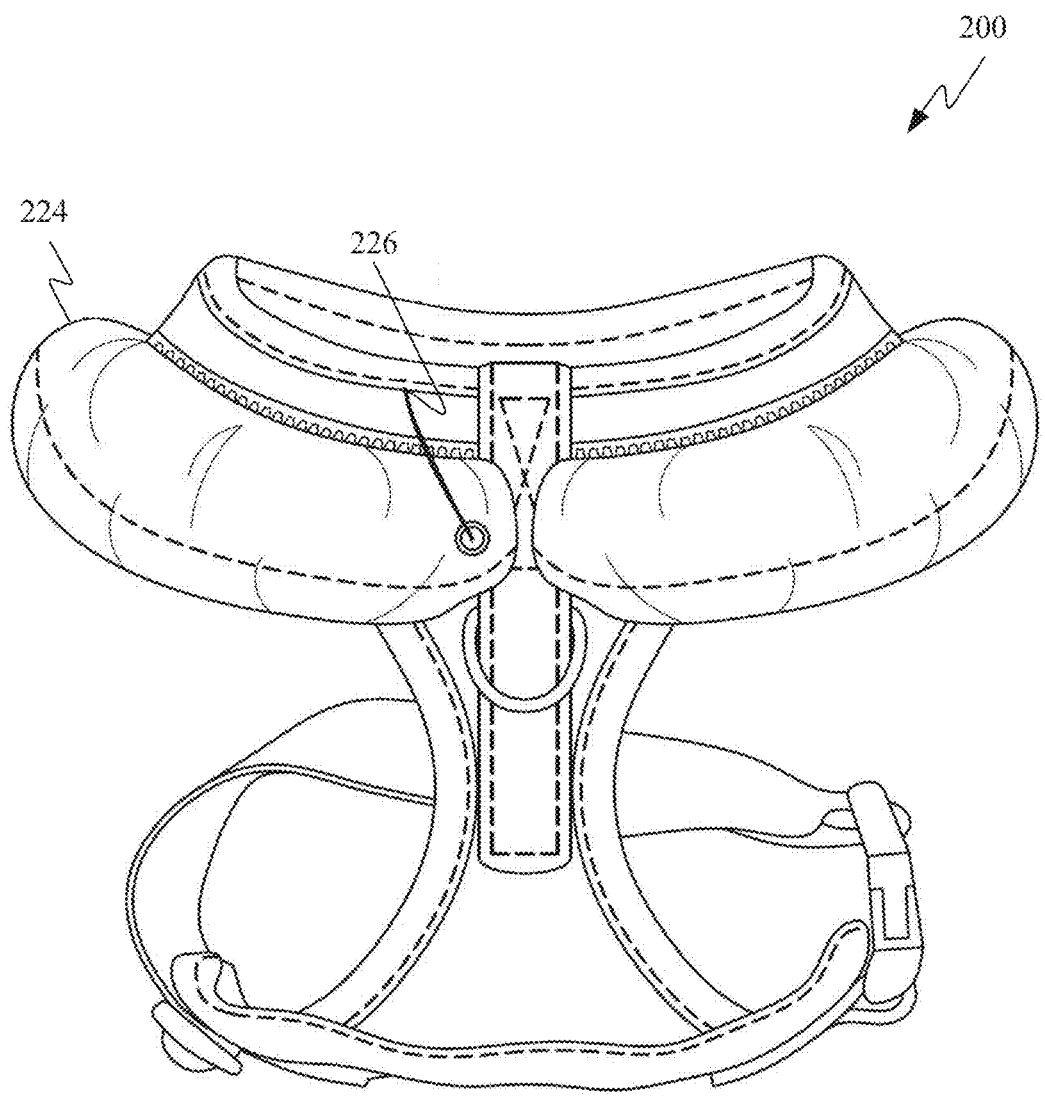

FIG. 2C shows another top view of pet harness 200 with a neck pillow 224 in a deployed state. As described previously, the deployed state is generally achieved by unzipping zipper 204, unrolling neck pillow 224 from the pouch region defined by neck portion 202 and inflating neck pillow 224. FIG. 2C also shows how neck pillow 224 includes an air valve 226 for receiving and expelling air from neck pillow 220. In some embodiments, air valve 226 can include a protruding tube to help a user manually inflate neck pillow 224. In other embodiments, air valve 222 can take the form of a Presta or Schrader valve for easy compatibility with a bike pump.

Figure 3A:
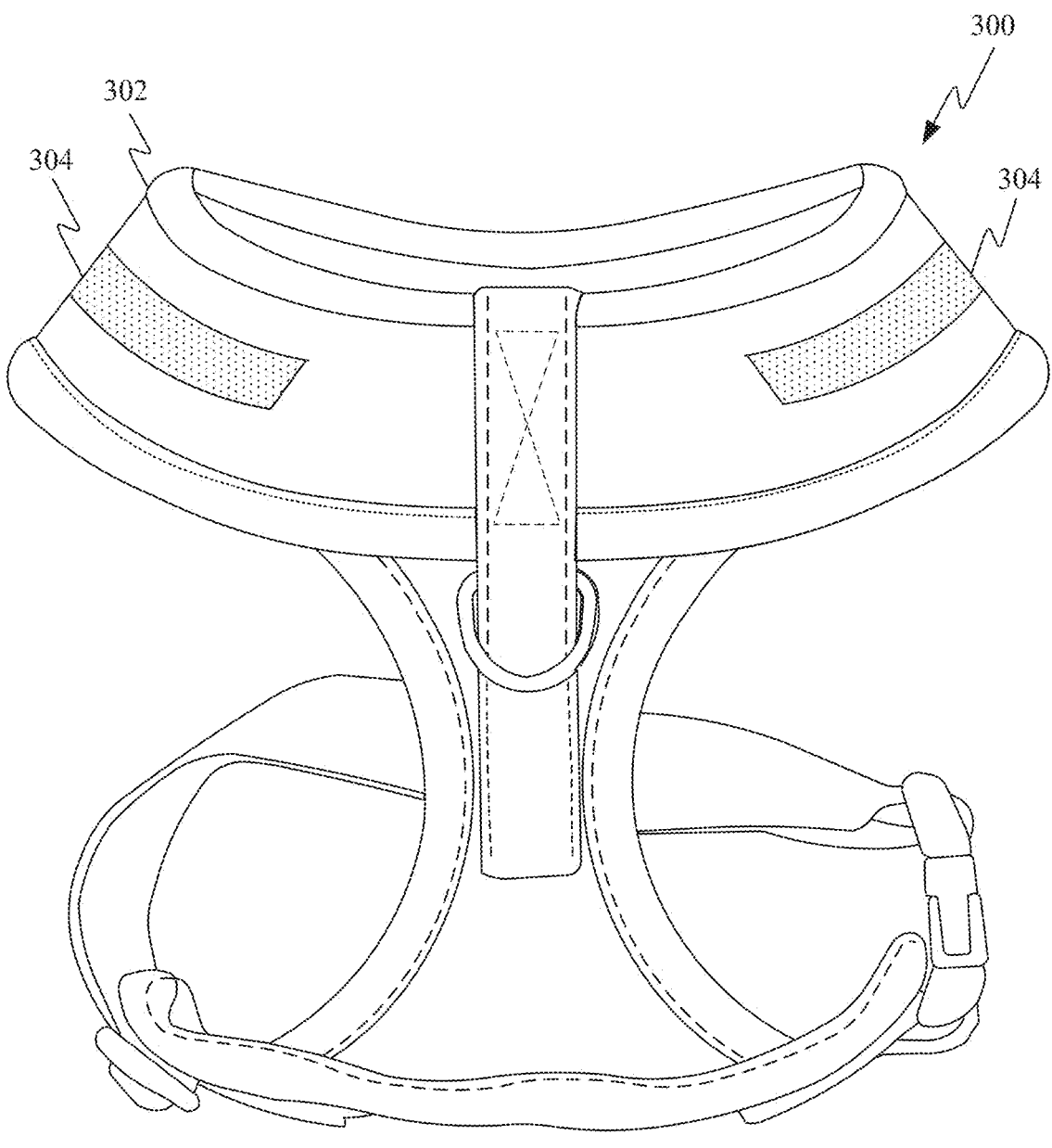
FIGS. 3A-3B show top and bottom views of a pet harness similar to the pet harness shown in FIGS. 2A-2C.
Figure 3B:
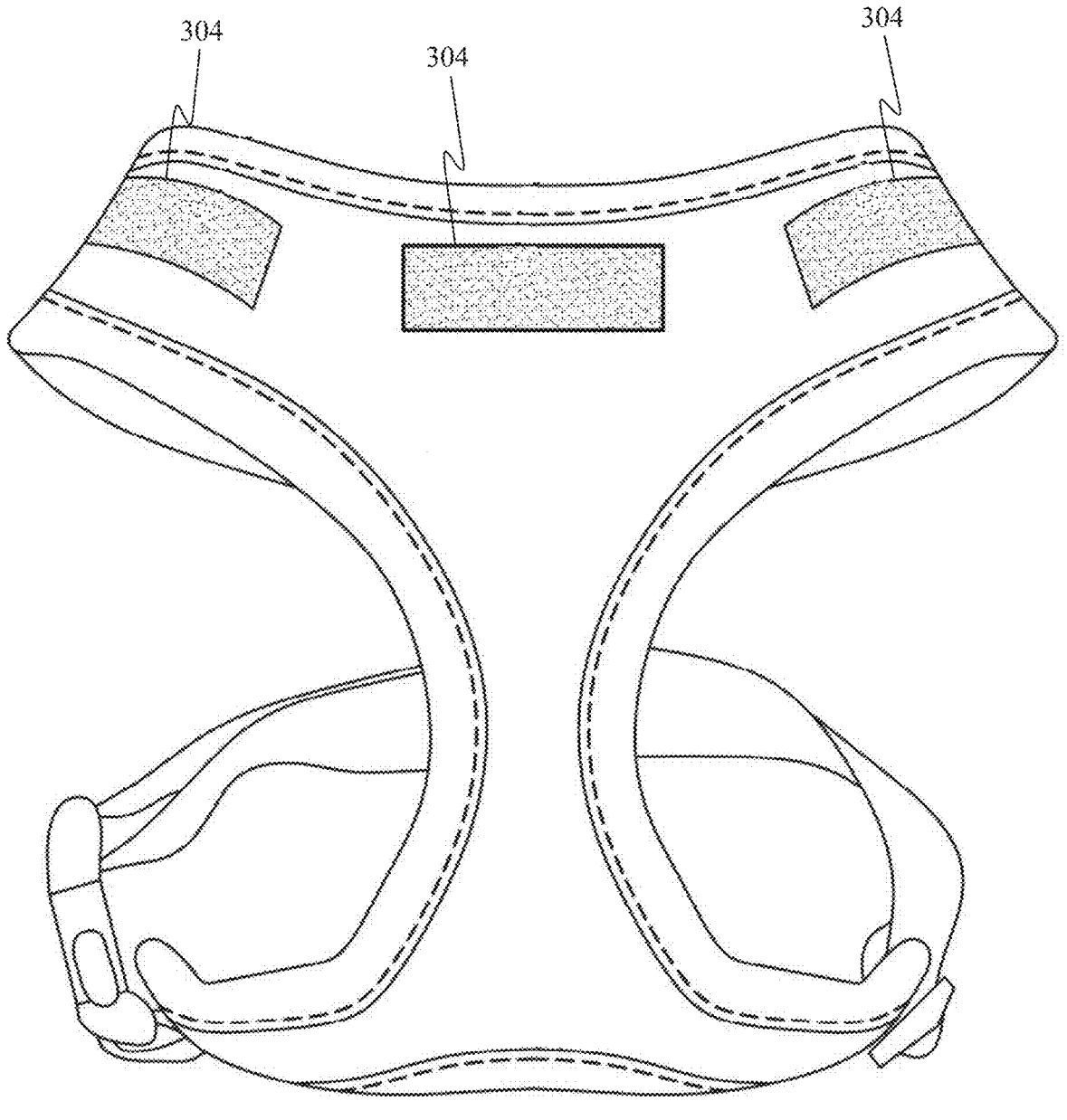

FIG. 3A shows a top view of a pet harness 300 similar to pet harness 200, shown in FIGS. 2A-2C. Pet harness 300 differs from pet harness 200 on account of it having a detachable neck pillow configuration enabled by multiple attachment features. The attachment features take the form of multiple hook-and-loop fastener (commonly sold under the trademark "Velcro®") strips 304 arranged around neck portion 302 to allow for convenient attachment of a neck pillow. FIG. 3B shows a bottom view of pet harness 300 and how multiple hook-and-loop fastener strips 304 extend around a periphery of neck portion 302 to allow hook-and-loop fastener strips 304 to be securely attached to neck portion 302.

Figure 4A:
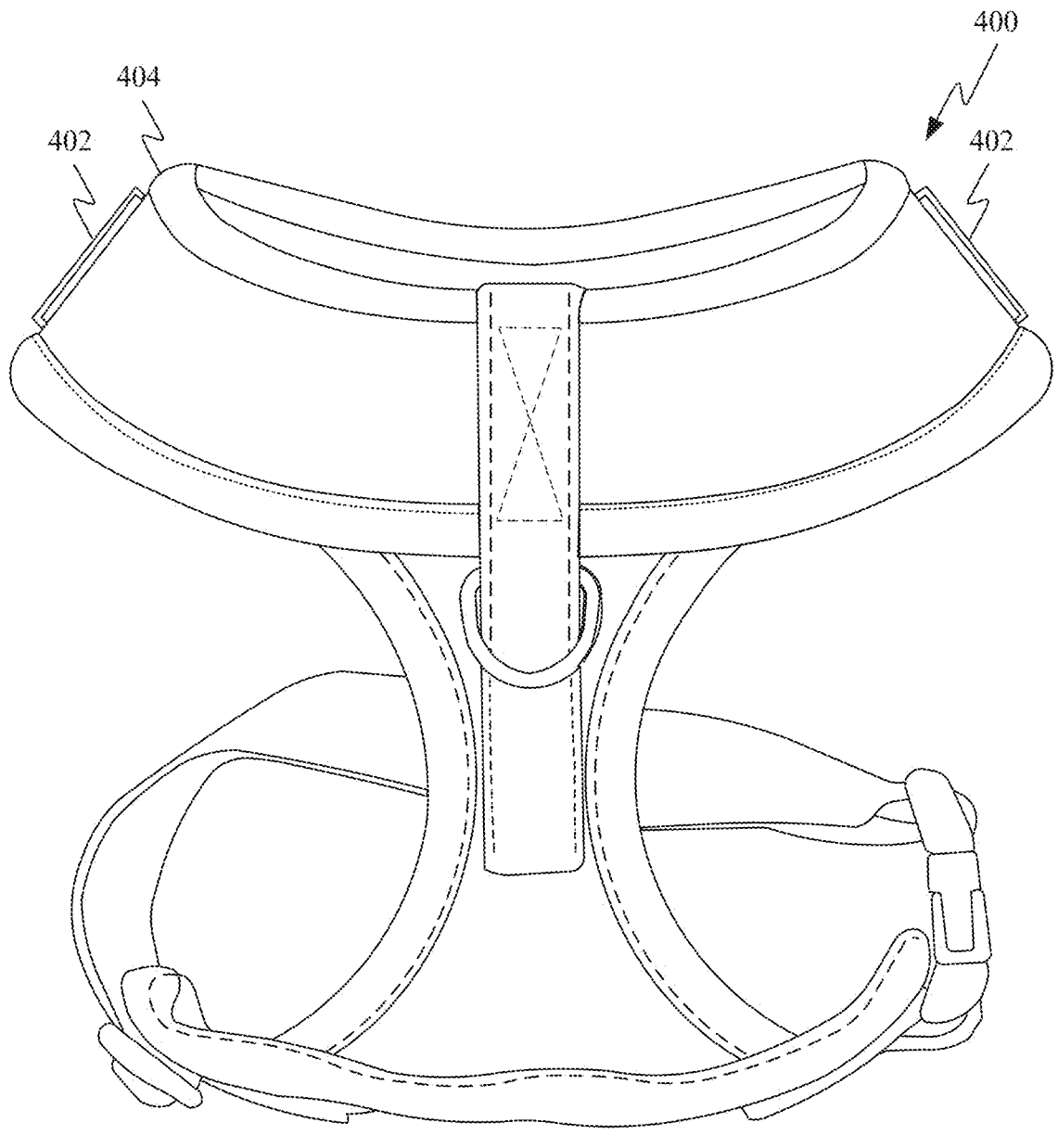
FIGS. 4A-4B show an additional pet harness having a configuration in which attachment features take the form of loops arranged around a periphery of a neck portion of a pet harness.
Figure 4B:
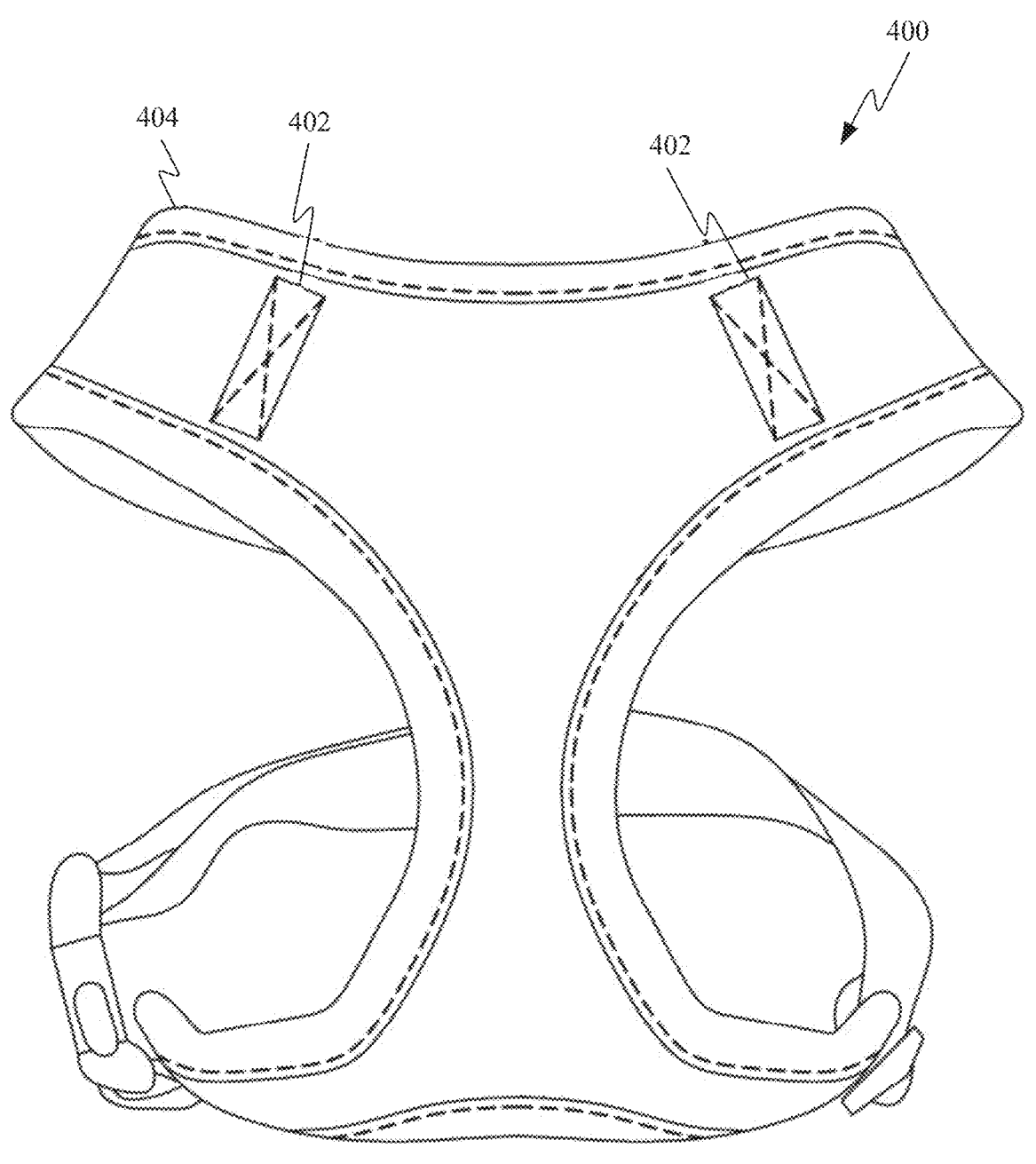

FIG. 4A shows an additional pet harness 400 having a configuration in which attachment features take the form of loops 402 arranged around a periphery of neck portion 404 of pet harness 400. Loops 402 are configured to engage and attach to a strap that extends around an interior edge of a neck pillow. FIG. 4B shows an opposite or bottom side of pet harness 400 and shows how additional loops 402 can be arranged on neck portion 404 to achieve a robust attachment between the strap on the neck pillow and neck portion 404.

Figure 5:
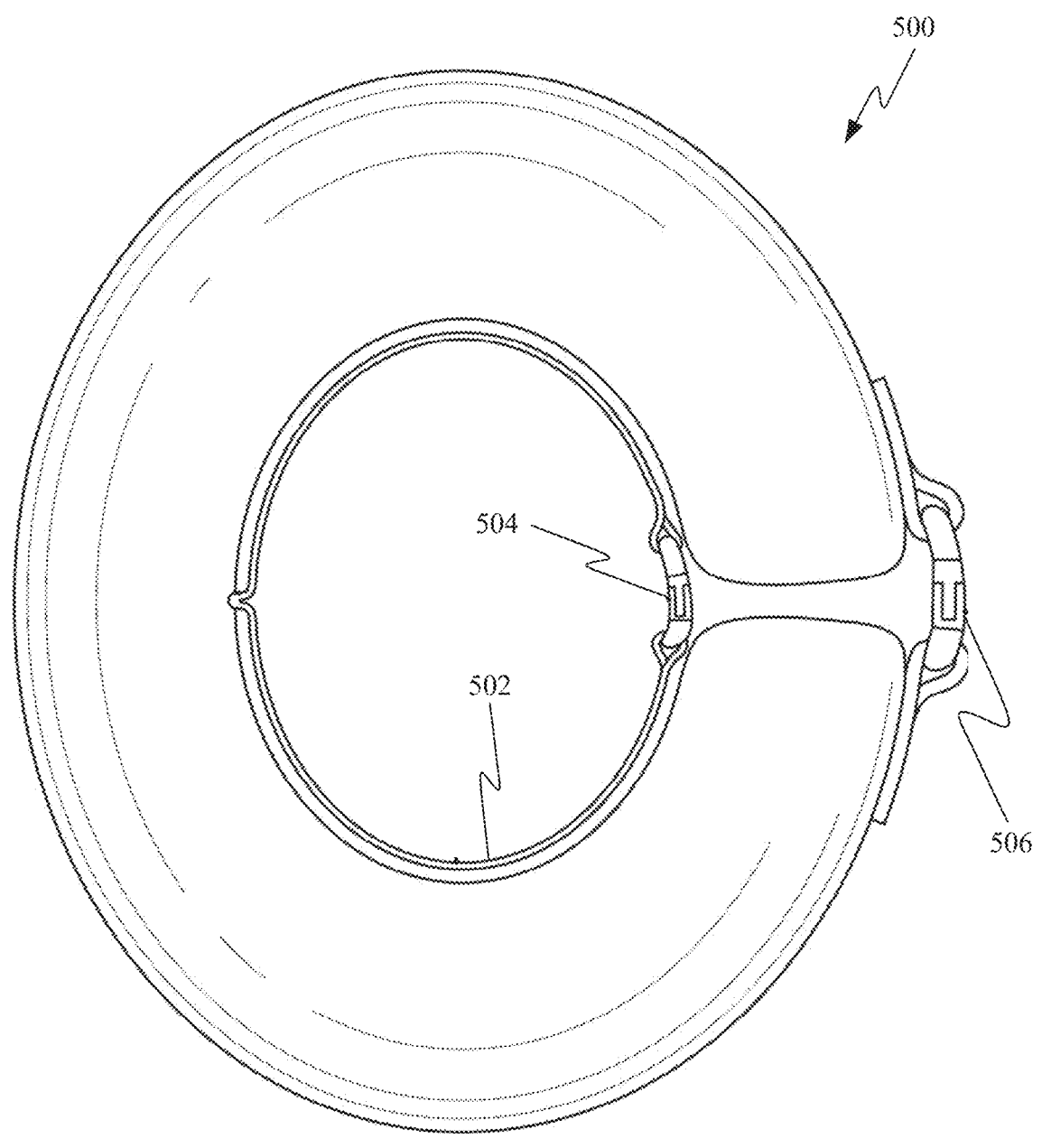
FIG. 5 shows an exemplary neck pillow compatible with the pet harness configuration depicted in FIGS. 4A-4B.

FIG. 5 shows an exemplary neck pillow 500 compatible with the pet harness configuration depicted in FIGS. 4A-4B. In particular, a strap 502 running around the interior edge of neck pillow 500 is depicted. Strap 502 includes a buckle 504 allowing it to be unbuckled when attaching it to loops arranged on embodiments similar to the embodiment of pet harness 400. Neck pillow 500 is also shown including an exterior buckle 506 that when engaged helps keep the ends of C-shaped neck pillow 500 from inadvertently separating and allowing a pet to get access to unhealed wounds.

Figure 6A:
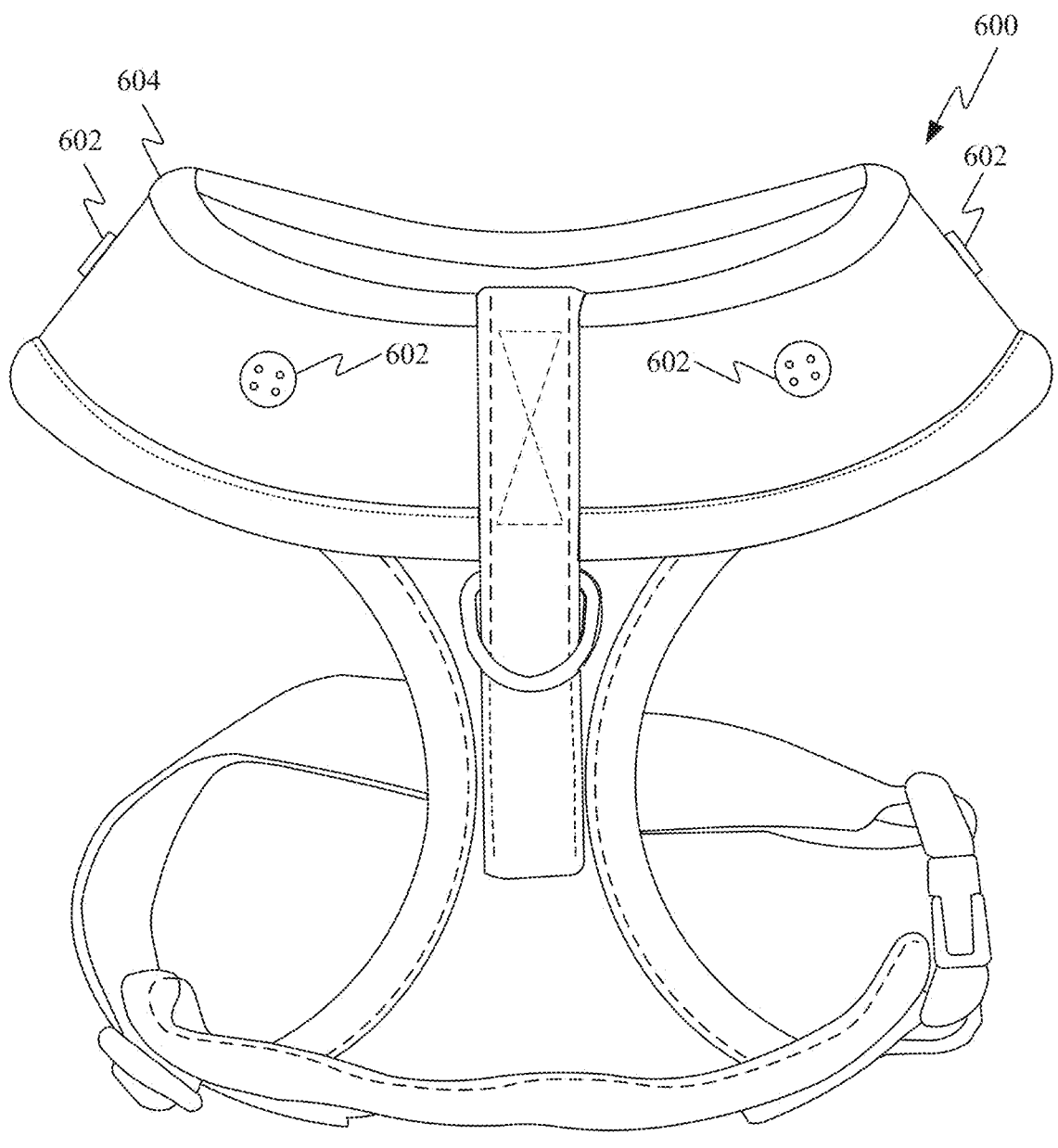
FIGS. 6A-6B show an additional pet harness having a configuration in which attachment features take the form of buttons arranged around a periphery of a neck portion of a pet harness.
Figure 6B:
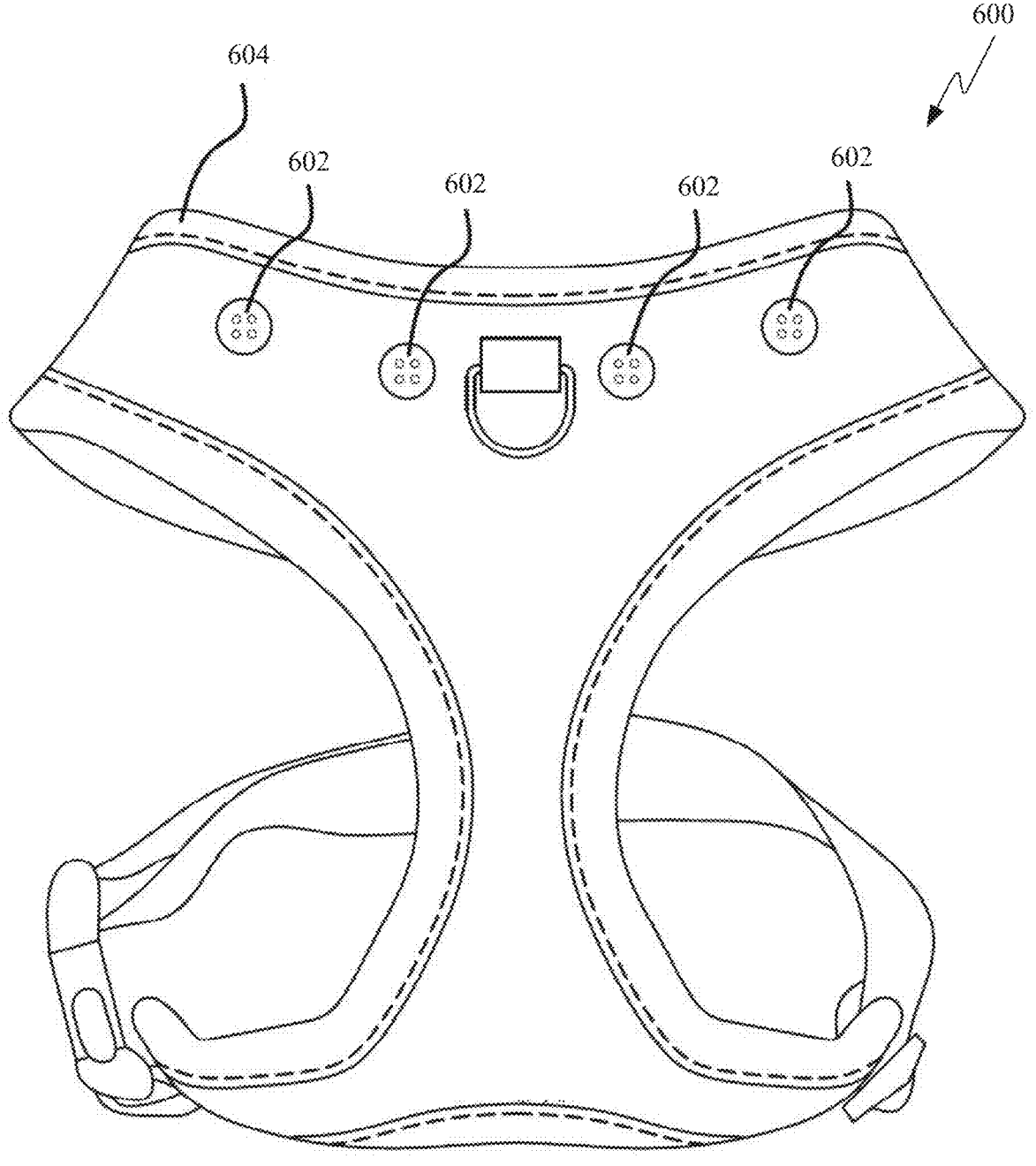

FIG. 6A shows an additional pet harness 600 having a configuration in which attachment features take the form of buttons 602 arranged around a periphery of neck portion 604 of pet harness 600. Buttons 602 are configured to engage slots distributed along a strap that extends around an interior edge of a neck pillow. FIG. 6B shows an opposite side of pet harness 600 and shows how an additional four buttons 602 can be arranged on an opposite side of neck portion 604 to achieve a robust attachment between the strap on the neck pillow and neck portion 604.

Figure 7:
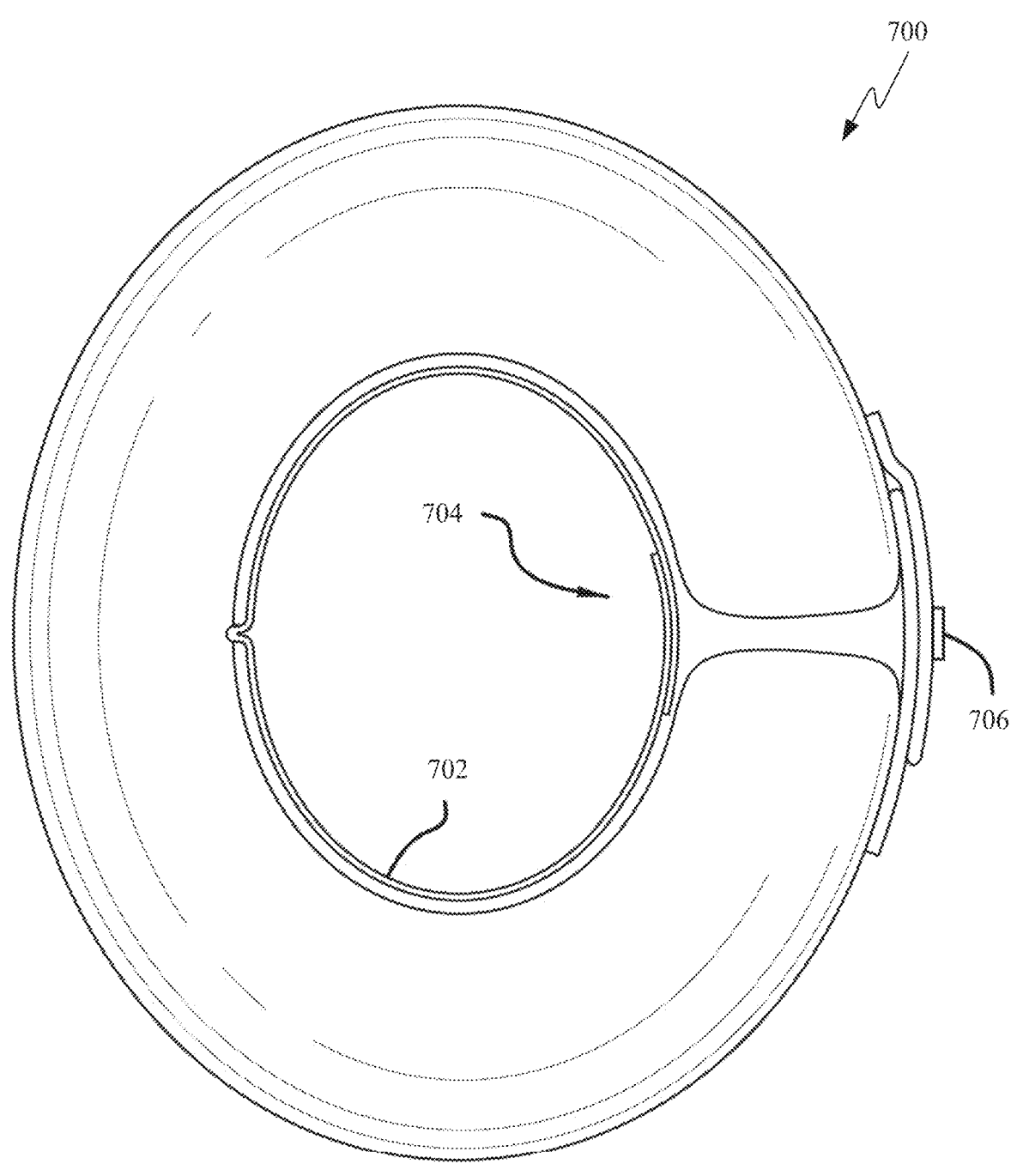
FIG. 7 shows an exemplary neck pillow compatible with the pet harness configuration depicted in FIGS. 6A-6B.

FIG. 7 shows an exemplary neck pillow 700 compatible with the pet harness configuration depicted in FIGS. 6A-6B. In particular, a strap 702 running around the interior edge of neck pillow 700 is depicted. Strap 702 includes a buckle 704 allowing it to be unbuckled when needed to remove. Neck pillow 700 is also shown including an exterior buckle 706 that when engaged helps keep the ends of C-shaped neck pillow 700 from inadvertently separating and allowing a pet to get access to unhealed wounds. In some embodiments, exterior buckle 706 can be configured with a push button release configuration.

Figure 8A:
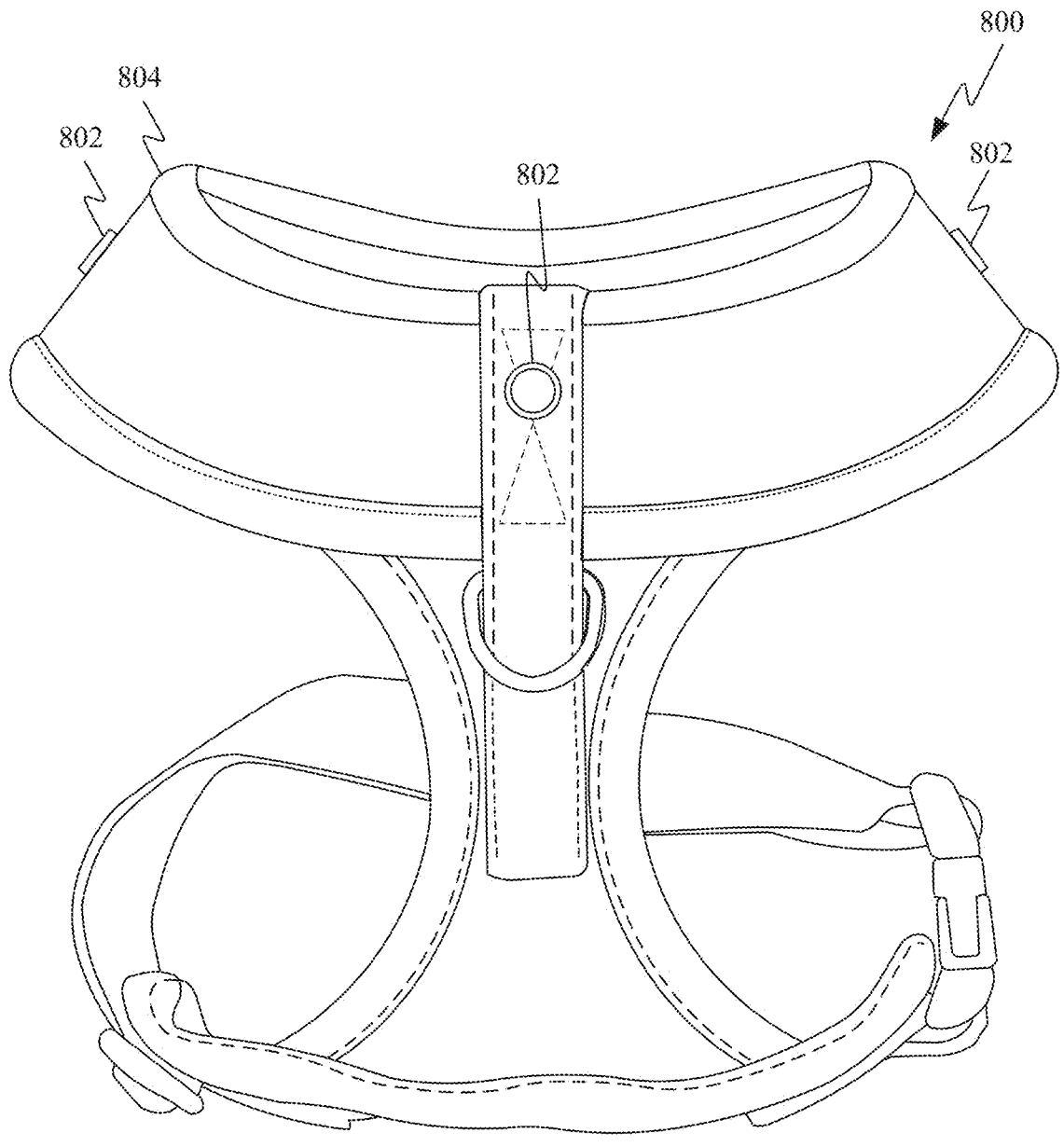
FIGS. 8A-8B show an additional pet harness having a configuration in which attachment features take the form of snaps arranged around a periphery of a neck portion of a pet harness.
Figure 8B:
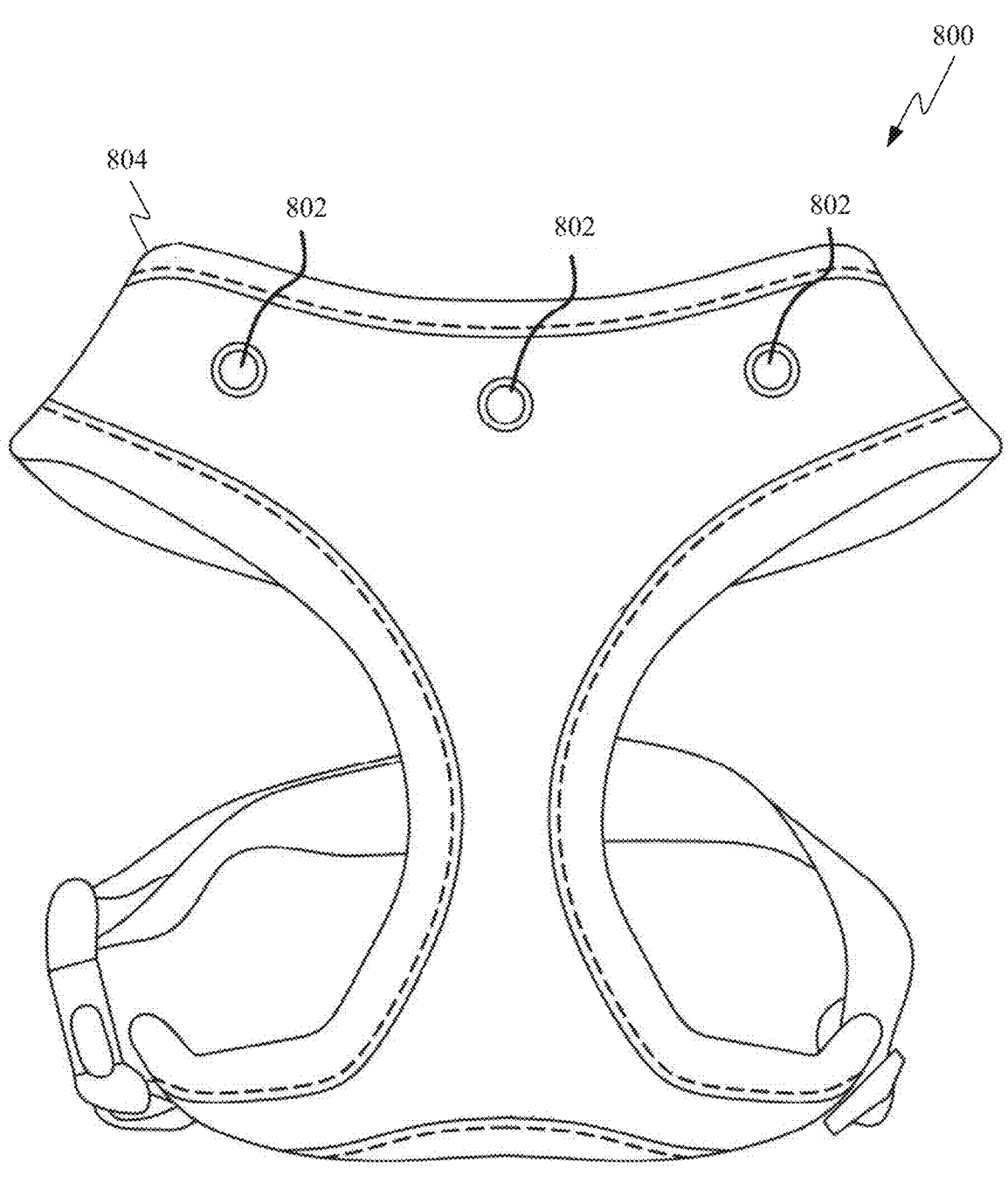

FIG. 8A shows an additional pet harness 800 having a configuration in which attachment features take the form of snaps 802 arranged around a periphery of neck portion 804 of pet harness 800. Snaps 802 are configured to engage matching snaps on a neck pillow. FIG. 8B shows an opposite side of pet harness 800 and shows how an additional three snaps 802 can be arranged on an opposite side of neck portion 804 to achieve a robust attachment between the neck pillow and neck portion 804.

Figure 9:
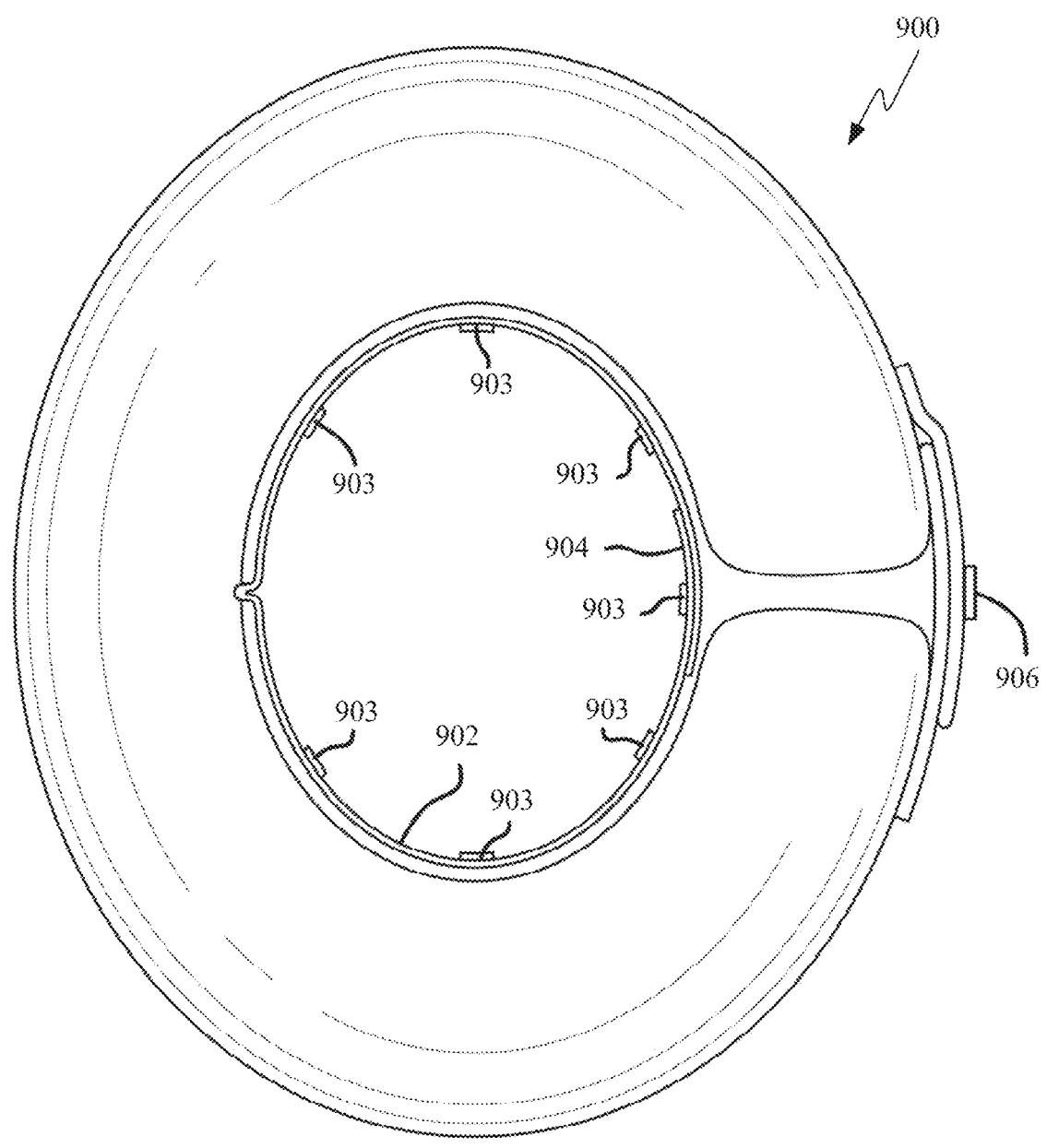
FIG. 9 shows an exemplary neck pillow compatible with the pet harness configuration depicted in FIGS. 8A-8B.

FIG. 9 shows an exemplary neck pillow 900 compatible with the pet harness configuration depicted in FIGS. 8A-8B. In particular, a strap 902 running around the interior edge of neck pillow 900 is depicted with multiple snaps 903 arranged to correspond to snaps 802 on pet harness 800. Strap 902 includes a buckle 904 allowing it to be unbuckled when needed to remove. Neck pillow 900 is also shown including an exterior buckle 906 that when engaged helps keep the ends of C-shaped neck pillow 900 from inadvertently separating and allowing a pet to get access to unhealed wounds. In some embodiments, exterior buckle 906 can be configured with a push button release configuration.

A number of implementations have been described. Nevertheless, it will be understood that various modifications may be made without departing from the spirit and scope of the disclosure. Accordingly, other implementations are within the scope of the following claims.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A pet harness, comprising:
a harness body, comprising:
a neck portion defining a neck opening configured to accommodate passage of a head of a pet therethrough;
a chest panel protruding from a first side of the neck portion and configured to extend between front legs of the pet;
a back panel protruding from a second side of the neck portion and configured to extend across a back of the pet;
a pouch mounted on the neck portion and extending around a periphery of the neck portion, the pouch defining a pouch opening facing outward from the neck portion and extending around at least a portion of the periphery of the neck portion;
a neck pillow coupled to and extending around the periphery of the neck portion of the harness body and coupled to an interior of the pouch, the neck pillow being inflatable and defining a deflated configuration and an inflated configuration, wherein in the deflated configuration the neck pillow is positioned entirely in the pouch with the pouch opening of the pouch closed, and wherein in the inflated configuration the neck pillow extends out through the pouch opening of the pouch and surrounds the neck portion;
a leash clip configured to accommodate attachment of a leash to the harness body; and
one or more straps extending from the harness body and configured to wrap around a torso of the pet to secure the harness body to the pet;
wherein the harness is configured to be worn by the pet for walking and other daily activities when the pillow is in the deflated configuration but allows for deployment of the neck pillow to the inflated configuration if needed to prevent the pet from accessing a wound.

2. The pet harness of claim 1, wherein the one or more straps comprises a girth strap configured to wrap around the torso of the pet behind a back of the front legs.

3. The pet harness of claim 1, wherein the leash clip is attached directly to the back panel.

4. The pet harness of claim 3, wherein the leash clip is a metal D-ring.

5. The pet harness of claim 1, wherein the leash clip is attached directly to the chest panel and configured to accommodate attachment of a leash to the chest panel of the harness body.

6. The pet harness of claim 1, wherein the pouch comprises a zipper covering the pouch opening of the pouch.

7. The pet harness of claim 6, wherein the zipper extends circumferentially around the neck portion of the harness body.

8. The pet harness of claim 1, wherein the pouch defines a cavity therein, the cavity is sized to contain the neck pillow in the deflated configuration, and the neck pillow is larger than the cavity in the inflated configuration.

9. The pet harness of claim 1, wherein the pouch opening of the pouch extends around the entire periphery of the neck portion.

10. The pet harness of claim 1, wherein the pouch opening extends in a circumferential direction around the neck portion and the pouch opening faces radially outward from the neck portion.

11. The pet harness of claim 1, wherein when the pillow is released from the pouch, it completely encircles the neck of the pet.

12. A method of using a pet harness, the method comprising:
attaching a pet harness to a pet, the harness comprising:
a harness body comprising:
a neck portion surrounding a neck of the pet;
a chest panel protruding from a first side of the neck portion and extending between front legs of the pet;
a back panel protruding from a second side of the neck portion and extending across a back of the pet;
a pouch mounted on the neck portion and extending around a periphery of the neck portion and around the neck of the pet, the pouch defining a pouch opening facing outward from the neck portion and extending around at least a portion of the periphery of the neck portion;

a neck pillow coupled to and extending around the periphery of the neck portion of the harness body and around the neck of the pet and coupled to an interior of the pouch;

a leash clip configured to accommodate attachment of a leash to the harness body; and one or more straps extending from the harness body;

wrapping the one or more straps around a torso of the pet to secure the harness body to the pet;

opening the pouching opening to access the neck pillow; and inflating the neck pillow to extend the neck pillow out of the pouch and around the neck of the pet, wherein the harness is configured to be worn by the pet for walking and other daily activities when the pillow is in the deflated configuration but allows for deployment of the neck pillow to the inflated configuration if needed to prevent the pet from accessing a wound.

13. The method of claim 12, wherein the pouch comprises a zipper covering the pouch opening of the pouch, and wherein opening the pouch comprises unzipping the zipper.

14. The method of claim 12, wherein the pouch defines a cavity therein, the cavity is sized to contain the neck pillow before inflating the neck pillow, and inflating the neck pillow comprises making the neck pillow larger than the cavity.

15. The method of claim 12, wherein the pouch opening of the pouch extends around the entire periphery of the neck portion.

16. The method of claim 12, wherein the pouch opening extends in a circumferential direction around the neck portion and the pouch opening faces radially outward from the neck portion.

* * * * *